United States Patent

[11] 3,631,708

[72] Inventor Robert T. Ensor
 Redding, Conn.
[21] Appl. No. 884,098
[22] Filed Dec. 11, 1969
[45] Patented Jan. 4, 1972
[73] Assignee Barnes Engineering Company
 Stamford, Conn.

[54] LIQUID BATH REFERENCE CAVITY
 2 Claims, 1 Drawing Fig.
[52] U.S. Cl................................................. 73/1 F,
 250/84
[51] Int. Cl................................................ G01j 5/00
[50] Field of Search.......................... 73/1 F, 355;
 250/84, 85

[56] References Cited
 UNITED STATES PATENTS
 3,348,408 10/1967 Engborg..................... 73/1 F
 3,419,709 12/1968 DeBell......................... 250/85

OTHER REFERENCES

Kostkowski, H. J. et al. in Temperature Its Measurement and Control in Science & Industry Vol. III Herzfeld ed. Part 1. Basic Concepts, Standards and Methods, Brickwedde, ed. Reinhold Pub. Co. N.Y. 1962 paper No. 47 pages 460 & 461 relied upon QC271AG

*Primary Examiner*—S. Clement Swisher
*Attorneys*—Joseph Levinson and Robert Ames Norton ABSTRACT: An improved liquid-bath-type reference cavity is provided, in which the cavity is formed by a closed-end metallic bellows. The walls of the bellows are fabricated from good thermal conducting materials with very thin wall thickness, which increases the effective surface area in contact with the liquid and provides a rapid stabilization of the cavity to the temperature of the liquid bath in which it is immersed.

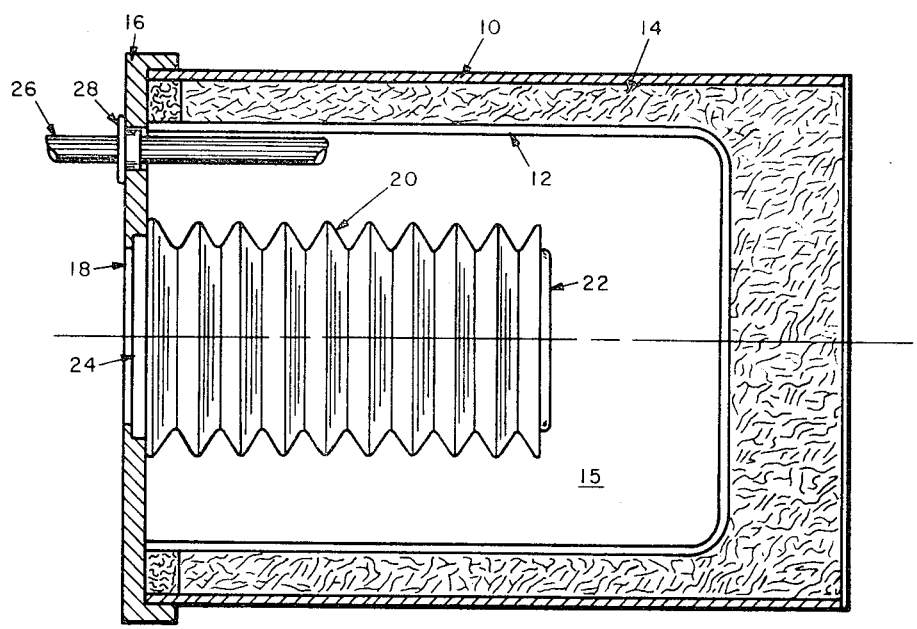

LIQUID BATH REFERENCE CAVITY

BACKGROUND OF THE INVENTION

Liquid bath type reference cavities provide an insulated reservoir which is filled with a liquid. A plastic cavity having, generally, a test-tube shape, is immersed along with a laboratory type thermometer in the liquid bath, and in theory the test-tube cavity stabilizes at the temperature of the liquid bath. Radiometers and other types of instrumentation can be calibrated by pointing them into the cavity so their entire fields of view are observing nothing but the interior of the test-tube cavity. The instrument's readout can be set to match the temperature indicated by the thermometer. One of the major difficulties encountered is that the cavity, which is made of plastic, has poor conductive properties and thus does not readily stabilize to the temperature of the liquid bath. Accordingly, the actual emitted temperature of the cavity may be several degrees different from that of the liquid bath, causing an error in the readouts of the instrument calibrated to the reference. Furthermore, outside radiation which is reflected into the cavity has also caused error.

Accordingly, it is an object of this invention to provide an improved liquid-bath-type reference cavity which minimizes calibration errors.

SUMMARY OF THE INVENTION

The improved liquid-bath-type reference cavity of this invention is obtained by using a closed-end thermally conductive bellows whose convolutions increase the effective surface area in contact with the liquid bath and in addition scatter and thus minimize the effects of unknown outside radiation being reflected into the aperture of instruments being calibrated.

BRIEF DESCRIPTION OF THE DRAWING

The drawing is a side view, partly in section, of the liquid bath type reference cavity embodied in this invention.

DESCRIPTION OF THE PREFERRED EMBODIMENT

Referring to the drawing, the liquid bath reference cavity has a body portion 10 having a reservoir 12 mounted therein and separated from the body 10 by insulation 14. The open end of the body portion 10 of the reference cavity is covered by a closing plate 16 having a central opening 18 therein. The reservoir 12 is filled with a suitable liquid 15, such as cooled or heated water. Mounted in the central opening 18 of the closing plate 16 is a thermally conductive bellows 20. Bellows 20 has a closed end 22 and an open end 24 such that the bellows 20 as mounted provides an enclosed cavity. The bellows 20 is fabricated from good thermal conductive material such as phosphor, bronze, or copper with a very thin wall thickness, on the order of 0.005 inch to 0.01 inch. A standard laboratory type mercury thermometer 26 or any other suitable temperature indicating means is immersed in the liquid bath 15 through a grommet 28 mounted in the closing plate 16.

In operation, instruments to be calibrated are pointed into the open end 24 of the bellows 20 which forms a cavity therein so that the entire field of view of the instrument is observing nothing but the interior of the cavity of the bellows 20. The readout of the instruments to be calibrated are set to match the temperature indicated by the thermometer 26. The advantages of the present invention reside in the use of the bellows 20 as the cavity. The convolutions of the bellows 20 increase the effective surface area in contact with the liquid 15, and since the bellows 20 is constructed of good thermally conductive materials, the cavity quickly stabilizes at the temperature of the liquid bath which is read on the thermometer 28. In addition, the convolutions of the bellows 20 help to scatter, and thus minimize, the effects of unknown outside radiation being reflected into the aperture of the instruments being calibrated. The interior surface of the bellows 20 is also blackened to reduce reflectivity and improve the emissivity of the cavity opening. By utilizing the improved construction that is embodied in this invention, tests on the bellows cavity showed that the measured temperature of the reference liquid and the emitted cavity temperature are the same within ½° C. or better.

I claim:

1. A liquid-bath-type reference cavity comprising in combination
   a. an insulated reservoir having an opening on one end thereof,
   b. said reservoir being filled with a liquid,
   c. a closed-end thermally conductive bellows submerged in said liquid and having its open end mounted in the opening of said reservoir, thereby providing a reference cavity the temperature of which is that of the liquid,
   d. means submerged in said liquid for indicating the temperature of said liquid.

2. The reference cavity set forth in claim 1 wherein said thermally conductive bellows is metallic having a wall thickness on the order of 0.005 to 0.010 inches with its interior surface blackened.

* * * * *